(12) United States Patent
Ichikawa et al.

(10) Patent No.: US 11,221,227 B2
(45) Date of Patent: Jan. 11, 2022

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Shinji Ichikawa, Nagoya (JP); Harunobu Saito, Nagoya (JP); Daiki Kaneichi, Nisshin (JP); Ryotaro Fujiwara, Tokyo-to (JP); Megumi Amano, Toyota (JP); Masato Endo, Nagakute (JP); Tae Sugimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 226 days.

(21) Appl. No.: 16/553,628

(22) Filed: Aug. 28, 2019

(65) Prior Publication Data
US 2020/0072628 A1   Mar. 5, 2020

(30) Foreign Application Priority Data

Aug. 28, 2018   (JP) .............................. JP2018-159426

(51) Int. Cl.
*G01C 21/34*   (2006.01)
*G01C 21/36*   (2006.01)

(52) U.S. Cl.
CPC ..... *G01C 21/3476* (2013.01); *G01C 21/3484* (2013.01); *G01C 21/3661* (2013.01); *G01C 21/3679* (2013.01)

(58) Field of Classification Search
CPC .............. G01C 21/343; G01C 21/3476; G01C 21/3484; G01C 21/3492; G01C 21/3617;
(Continued)

(56) References Cited

U.S. PATENT DOCUMENTS

| | | | | |
|---|---|---|---|---|
| 2014/0129139 | A1* | 5/2014 | Ellison | ............... G01C 21/3469 701/533 |
| 2016/0061617 | A1* | 3/2016 | Duggan | ................ G06F 16/248 701/538 |

(Continued)

FOREIGN PATENT DOCUMENTS

| | | |
|---|---|---|
| JP | H09-304088 A | 11/1997 |
| JP | 2014-182027 A | 9/2014 |

*Primary Examiner* — Spencer D Patton
(74) *Attorney, Agent, or Firm* — Oliff PLC

(57) ABSTRACT

A technique for outputting information relevant to a facility suitable for an action of a user at a point in a traveling route or at a destination is provided. An information processing apparatus comprises a controller which executes acquisition or estimation of a traveling route of a user; calculation of temporal information including at least one of a passage time at which the user passes through a point on the traveling route and a traveling period of time which is required until arrival at the point after starting a travel; acquisition of information relevant to a facility suitable for the user who passes through the point, of a plurality of facilities existing around the point on the basis of the temporal information; and output of the information relevant to the facility by means of an output unit.

10 Claims, 9 Drawing Sheets

(58) Field of Classification Search
CPC ............ G01C 21/3661; G01C 21/3679; G01C 21/3682; G01C 21/3697; G01C 21/3889; G01C 21/3469
See application file for complete search history.

(56) References Cited

U.S. PATENT DOCUMENTS

2017/0010116 A1* 1/2017 Inoue ...................... B60L 53/62
2017/0234695 A1* 8/2017 Lee ................... G06Q 30/0261
                                                                                   701/533

* cited by examiner

20081

| POINT | CLASSIFICATION | INFORMATION 1 | INFORMATION 2 | INFORMATION 3 |
|---|---|---|---|---|
| POINT 1 | RESTAURANT | . . . | . . . | . . . |
| POINT 1 | SIGHTSEEING | . . . | . . . | . . . |
| POINT 1 | REFUELING | . . . | . . . | . . . |
| POINT 1 | LODGING | . . . | . . . | . . . |
| POINT 1 | REST | . . . | . . . | . . . |
| POINT 2 | RESTAURANT | . . . | . . . | . . . |
| ⋮ | ⋮ | ⋮ | ⋮ | ⋮ |

| CLASSIFICATION | TIME ZONE |
|---|---|
| RESTAURANT | T1 |
| SIGHTSEEING | T2 |
| REFUELING | T3 |
| LODGING | T4 |
| ⋮ | ⋮ |

Fig. 5

| ID | POSITION |
|---|---|
| A001 | X1 |
| A002 | X2 |
| A003 | X3 |
| A004 | X4 |
| ⋮ | ⋮ |

INFORMATION PROCESSING APPARATUS, INFORMATION PROCESSING METHOD, AND NON-TRANSITORY STORAGE MEDIUM

CROSS REFERENCE TO RELATED APPLICATION

This application claims the benefit of Japanese Patent Application No. 2018-159426, filed on Aug. 28, 2018, which is hereby incorporated by reference herein in its entirety.

BACKGROUND

Technical Field

The present disclosure relates to an information processing apparatus, an information processing method, and a non-transitory storage medium.

Description of the Related Art

A technique for supporting the travel to the destination has been suggested. Patent Literature 1 suggests such a technique that guidance information, which is composed of destination information and information relevant to a positional relationship with respect to a destination, is generated and transmitted to a digital signage. Further, Patent Literature 2 suggests such a technique that a fuel supply point is calculated on the basis of a remaining gasoline amount and an average fuel consumption amount, and gasoline stations, which are located in the vicinity of the point, are displayed on a map display device.

PRIOR ART LITERATURE

Patent Literature

Patent Literature 1: Japanese Patent Application Laid-Open No. 2014-182027
Patent Literature 2: Japanese Patent Application Laid-Open No. 9-304088

SUMMARY

An object of one aspect of the disclosed technique is to provide a technique for outputting information relevant to a facility suitable for a user at a point in a traveling route or at a destination.

A first aspect of the disclosed technique resides in an information processing apparatus comprising a controller which executes:
  acquisition or estimation of a traveling route of a user;
  calculation of temporal information including at least one of a passage time at which the user passes through a point on the traveling route and a traveling period of time which is required until arrival at the point after starting a travel;
  acquisition of information relevant to a facility suitable for the user who passes through the point, of a plurality of facilities existing around the point on the basis of the temporal information; and
  output of the information relevant to the facility by means of an output unit.

A second aspect of the disclosed technique resides in an information processing method comprising:
  acquiring or estimating a traveling route of a user;
  calculating temporal information including at least one of a passage time at which the user passes through a point on the traveling route and a traveling period of time which is required until arrival at the point after starting a travel;
  acquiring information relevant to a facility suitable for the user who passes through the point, of a plurality of facilities existing around the point on the basis of the temporal information; and
  outputting the information relevant to the facility by means of an output unit.

A third aspect of the disclosed technique resides in a non-transitory storage medium stored with an information processing program,
  the information processing program for causing a computer to:
  acquisition or estimation of a traveling route of a user;
  calculation of temporal information including at least one of a passage time at which the user passes through a point on the traveling route and a traveling period of time which is required until arrival at the point after starting a travel;
  acquisition of information relevant to a facility suitable for the user who passes through the point, of a plurality of facilities existing around the point on the basis of the temporal information; and
  output of the information relevant to the facility by means of an output unit.

According to the disclosed technique, it is possible to output the information relevant to the facility suitable for the user at the point in the traveling route.

BRIEF DESCRIPTION OF THE DRAWINGS

FIG. 4 shows an exemplary point information table stored in a point database.
FIG. 5 shows an exemplary classification management table stored in the point database.
FIG. 6 shows an exemplary signage management table of a signage database.

DESCRIPTION OF THE EMBODIMENTS

Figure 1:
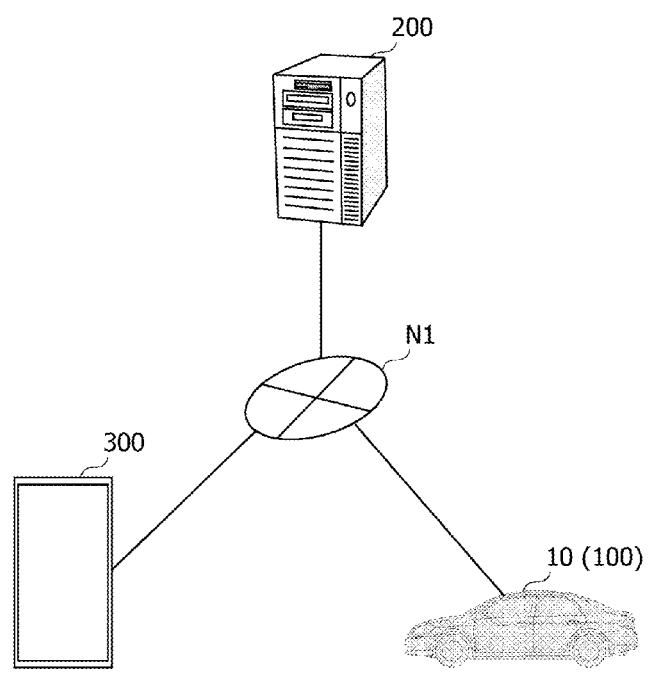
FIG. 1 shows an exemplary guide system according to an embodiment.

A variety of techniques have been suggested to support the travel to the destination. For example, a system such as a car navigation system has been suggested, in which a traveling route from a present location to a destination is determined to guide the travel until arrival at the destination in accordance with the traveling route. Further, for example, as disclosed in Patent Literature 1, such a technique has been suggested that guidance information, which is composed of destination information and information relevant to a positional relationship with respect to a destination, is generated and displayed on a digital signage (see, for example, Patent Literature 1).

However, in the case of the conventional technique, the information, which supports the travel until arrival at the destination, is provided, but any information, which is relevant to any facility suitable for a user at the destination or at each of points (points on a map) until arrival at the destination, is not provided.

An embodiment of the present disclosure discloses an information processing apparatus which makes it possible to provide information relevant to a facility suitable for a user who passes through a point (point on a map) on a traveling route.

An information processing apparatus according to the embodiment of the present disclosure comprises a controller which executes acquisition or estimation of a traveling route of a user; calculation of temporal information including at least one of a passage time at which the user passes through a point on the traveling route and a traveling period of time which is required until arrival at the point after starting a travel; acquisition of information relevant to a facility suitable for the user who passes through the point, of a plurality of facilities existing around the point; and output of the information relevant to the facility by means of an output unit.

The traveling route of the user is the traveling route along which the user travels from a departure place to a destination. The traveling route is determined, for example, by a variety of navigation systems exemplified by a car navigation system. The information processing apparatus may acquire the traveling route determined by the navigation system. For example, a vehicle onboard apparatus, which is carried on a vehicle or automobile, may be provided with the navigation system. Alternatively, for example, an information device possessed by the user may be provided with the navigation system. The information device possessed by the user is, for example, a smartphone, a tablet type computer, a note type personal computer or the like. The user may travel on foot, or the user may travel while getting on an automobile, a bicycle, a motorcycle or the like.

The point (point on a map) may be one point which is indicated by the latitude and the longitude. Alternatively, the point may be a region which has a certain degree of area. The term "around the point" may indicate a range of a predetermined distance about the center of the point, or the term may indicate an area comparted by the administrative division such as a town, a city or the like including the point.

The facility suitable for the user who passes through the point can be exemplified, for example, by restaurants and dining rooms if the temporal information indicates the time zone in which people take a meal such as a dinner or the like. Further, for example, if the temporal information indicates the daytime time zone suitable for the sightseeing and the shopping, the facility suitable for the user who passes through the point can be exemplified by shops and sightseeing facilities. If the temporal information indicates the elapse of a predetermined period of time assumed for the user to take a rest after the start of the travel, the facility can be exemplified by lodging facilities, roadside restaurants, roadside rest areas and the like. The output unit is, for example, a signage arranged on the traveling route or a display of an information device possessed by the user.

In the disclosed technique, the information relevant to the facility may be outputted at a higher frequency as the user more approaches the point. As for the higher frequency, for example, the time interval for outputting the information may be set to be shorter, or the information may be outputted by a larger number of the output units. When the configuration is adopted as described above, the facility can be impressed to the user more intensely.

In the disclosed technique, the information relevant to the facility may include a plurality of levels of information ranging from information which indicates details of the facility to information which indicates an outline; and the controller may output more detailed information as the user more approaches the point. In other words, the information relevant to the facility may include a plurality of levels of information having different amounts of information; and the controller may output information relevant to the facility while increasing the amount of information as the user more approaches the point. When the configuration is adopted as described above, the user, who is positioned at a position separated from the point, can be informed of the existence of the facility. Further, the user, who approaches the point, can determine whether or not the facility is utilized on the basis of the detailed information.

In the disclosed technique, the information processing apparatus may execute acquisition of a remaining amount of motive energy of a moving body used by the user to travel; prediction of a supply area for supplying the motive energy on the basis of the acquired remaining amount; acquisition of the information relevant to the supply facility existing around the supply area; and output of the extracted information relevant to the supply facility by means of the output unit.

The moving body can be exemplified, for example, by automobiles and motorcycles. The motive energy is the energy source for moving the moving body. In the case of a gasoline-powered vehicle, the motive energy can be exemplified by gasoline. In the case of a Diesel car, the motive energy can be exemplified by gas oil (light oil). In the case of an electric vehicle, the motive energy can be exemplified by electricity. In the case of a hydrogen vehicle, the motive energy can be exemplified by hydrogen. The supply facility can be exemplified by a gasoline station, an electric vehicle charging station, and a hydrogen station. The supply area, in which the motive energy is supplied, may be, for example, the next point at which the moving body will arrive, if the remaining amount of the motive energy of the moving body is not more than a predetermined amount.

In the disclosed technique, the information processing apparatus may execute acquisition of action history including a list of facilities having been utilized by the user; and acquisition of information relevant to the facility included in the action history, of the facilities suitable for the user who passes through the point. When the configuration is provided as described above, the information processing apparatus can thereby output the information relevant to the facility which more conforms to the action of the user.

In the disclosed technique, the information processing apparatus may execute acquisition of an action schedule of the user from communication data of communication having been made between the user and another person; and acquisition of information relevant to the facility suitable for the user who passes through the point, on the basis of the action schedule and the temporal information. Further, the action schedule may include a purpose of the user to be achieved at the point. The purpose includes, for example, information which indicates the action desired by the user to be executed at the destination, including, for example, "meal" and "sightseeing". When the feature is provided as described above, the information processing apparatus can thereby predict the action of the user on the basis of the action schedule, for example, if the user makes communication with another person about the action schedule. Thus, it is possible to raise the accuracy of prediction.

In the disclosed technique, the output unit may be a digital signage arranged on the traveling route. When the information is outputted to the digital signage arranged on the traveling route, the information relevant to the facility is thereby displayed as if the displayed information is a part of the surrounding scenery or landscape. Therefore, such an impression that the information relevant to the facility is forced on the user is mitigated, and the information relevant to the facility is easily accepted by the user.

The disclosed technique explained above can be also grasped as aspects of an information processing method and an information processing program.

An explanation will be made in further detail below with reference to the drawings about an embodiment of the disclosed technique. The configuration of the embodiment described below is exemplified by way of example. The disclosed technique is not limited to the configuration of the embodiment.

Embodiment

FIG. 1 shows an exemplary guide system according to this embodiment. The guide system 1 according to this embodiment comprises a vehicle onboard apparatus 100 which is carried on a vehicle 10, a guide server 200, and a signage 300. The vehicle onboard apparatus 100, the guide server 200, and the signage 300 are connected to one another by means of a network N1.

The vehicle 10 is an automobile provided with the vehicle onboard apparatus 100, and the vehicle 10 is driven by a user. The vehicle onboard apparatus 100 is an information processing apparatus carried on the vehicle 10. The vehicle onboard apparatus 100 includes a car navigation system which utilizes, for example, the Global Positioning System (GPS). If a destination is designated by the user, the vehicle onboard apparatus 100 determines the traveling route until arrival at the designated destination. The vehicle onboard apparatus 100 guides the travel until arrival at the destination on the basis of the determined traveling route and the present position of the vehicle 10 acquired by GPS. Further, the vehicle onboard apparatus 100 transmits the determined traveling route and the present position of the vehicle 10 to the guide server 200.

If the traveling route is received from the vehicle onboard apparatus 100, the guide server 200 estimates the traveling period of time required until the vehicle 10 arrives at a point (point on a map), in relation to the point on the traveling route. As for the point on the traveling route, either one point or a plurality of points is/are available. The point on the traveling route is selected on the basis of various conditions. A plurality of points on the traveling route may be selected, for example, so that the user can take a rest every predetermined periods of time or the traveling period of time is provided every predetermined periods of time (for example, at intervals of 1 hour). Alternatively, the point on the traveling route may be the destination designated by the user. Further alternatively, the guide server may store information relevant to respective points beforehand, and the guide server may select the point existing on the traveling route, of the stored points. The guide server 200 predicts the activity (action) of the user at the point on the traveling route, and the guide server 200 outputs, to the signage 300, the information in relation to the predicted activity. The activity is, for example, meal, shopping, sightseeing, and rest.

The signage 300 is a display apparatus having a display. The type of the display of the signage 300 is not specifically limited. The display, which can be adopted for the signage 300, is, for example, Liquid Crystal Display (LCD), Plasma Display Panel (PDP), Electroluminescence (EL) panel, and organic EL panel. The signage 300 displays the information received from the guide server 200.

Figure 2:
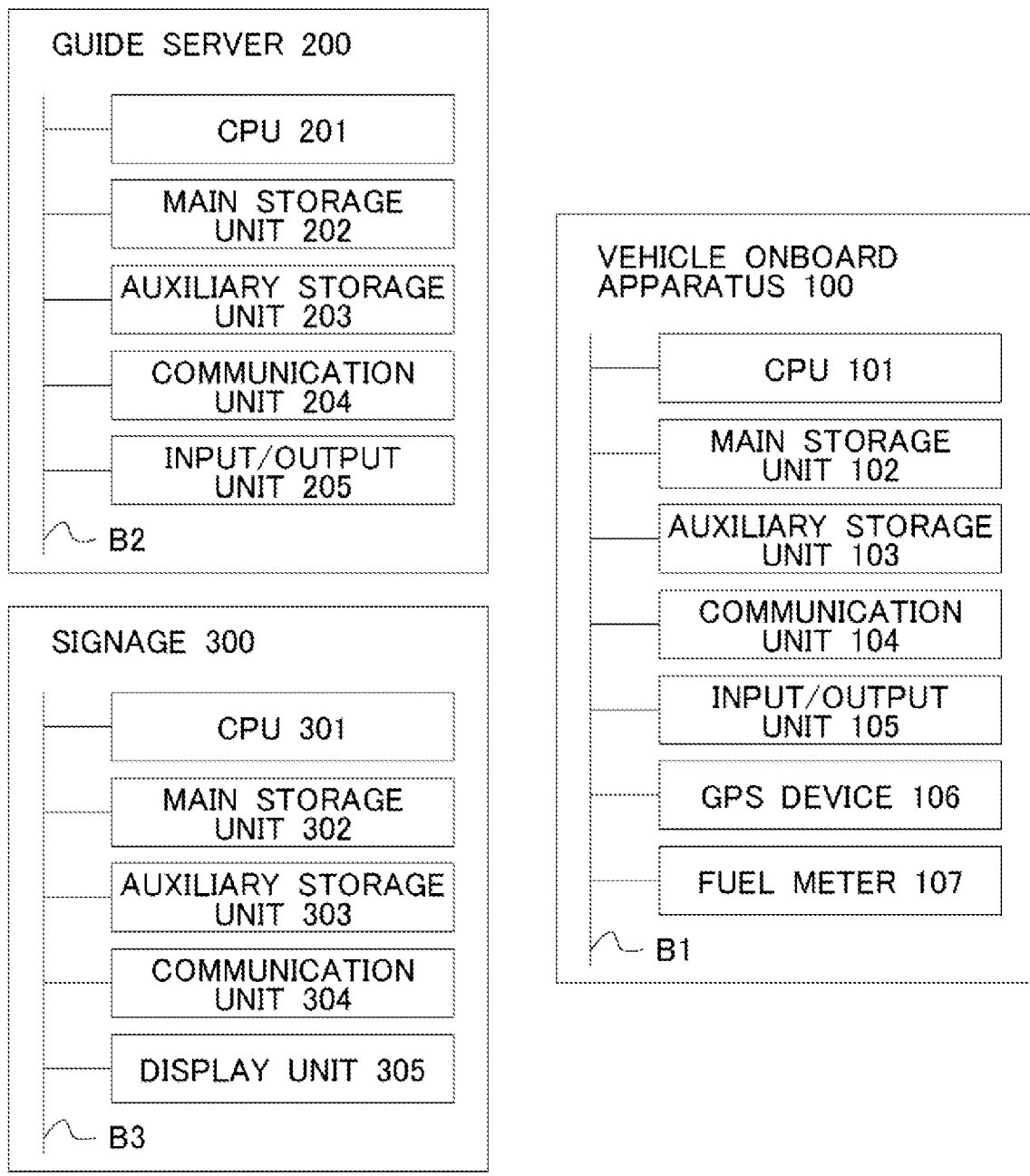
FIG. 2 shows exemplary hardware configuration of the guide system according to the embodiment.

FIG. 2 shows exemplary hardware configuration of the guide system according to the embodiment. FIG. 2 exemplifies the hardware configuration of the vehicle onboard apparatus 100, the guide server 200, and the signage 300 of the guide system 1 by way of example.

The vehicle onboard apparatus 100 is provided with a Central Processing Unit (CPU) 101, a main storage unit 102, an auxiliary storage unit 103, a communication unit 104, an input/output unit 105, a GPS device 106, and a fuel meter 107. CPU 101, the main storage unit 102, the auxiliary storage unit 103, the communication unit 104, the input/output unit 105, the GPS device 106, and the fuel meter 107 are connected to one another by means of a connecting bus B1.

CPU 101 is also referred to as "microprocessor unit (MPU)" or "processor". CPU 101 is not limited to a single processor. CPU 101 may be constructed as a multiprocessor. Further, single CPU 101, which is connected by a single socket, may have multicore configuration. At least a part of the process executed by CPU 101 may be performed by any processor other than CPU 101, for example, by any exclusive processor including, for example, a Digital Signal Processor (DSP), a Graphics Processing Unit (GPU), a numeric data processor, a vector processor, and an image processing processor. Further, at least a part of the process executed by CPU 101 may be performed by any integrated circuit (IC) or any other digital circuit. Further, an analog circuit may be included in at least a part of CPU 101. The integrated circuit includes a Large Scale Integrated circuit (LSI), Application Specific Integrated Circuit (ASIC), and a programmable logic device (PLD). PLD includes, for example, a Field-Programmable Gate Array (FPGA). CPU 101 may be a combination of the processor and the integrated circuit. The combination is referred to, for example, as "microcontroller unit (MCU)", "System-on-a-chip (SoC)", "system LSI", or "chip set". In the vehicle onboard apparatus 100, the program, which is stored in the auxiliary storage unit 103, is developed by CPU 101 to the operation area of the main storage unit, and peripheral apparatuses or devices are controlled in accordance with the execution of the program. Accordingly, the vehicle onboard apparatus 100 can execute the process which conforms to the predetermined purpose. The main storage unit 102 and the auxiliary storage unit 103 are storage media capable of being read by the vehicle onboard apparatus 100.

The main storage unit 102 is exemplified as a storage unit which is directly accessed by CPU 101. The main storage unit 102 includes a Random Access Memory (RAM) and a Read Only Memory (ROM).

The auxiliary storage unit 103 readably/writably stores various programs and various data on the recording medium. The auxiliary storage unit 103 is also referred to as "external storage device". For example, an operating system (Operating System, OS), various programs, and various tables are stored in the auxiliary storage unit 103. OS includes a communication interface program to accept/deliver the data with respect to, for example, any external apparatus or device connected via the communication unit 104. The external apparatus or device or the like includes, for example, any other information processing apparatus and an external storage apparatus or device connected, for example, by a computer network.

The auxiliary storage unit 103 is, for example, an Erasable Programmable ROM (EPROM), a solid state drive (Solid State Drive, SSD), or a hard disk drive (Hard Disk Drive, HDD). Further, the auxiliary storage unit 103 is, for example, a Compact Disc (CD) drive device, a Digital Versatile Disc (DVD) drive device, or a Blu-ray (registered trademark) Disc (BD) drive device.

The communication unit 104 is, for example, an interface with respect to the network N1. The communication unit 104 makes communication with the external apparatus or device by the aid of the network N1.

The input/output unit 105 includes an input unit which accepts, for example, an operation instruction, for example, from a user and an output unit which outputs a result of calculating process performed by CPU 101. The input unit is, for example, a keyboard, a pointing device, a touch panel, or a voice input device. The output unit is, for example, a CRT display, LCD, PDP, an EL panel, an organic EL panel, or a speaker.

The GPS device 106 acquires the present position of the vehicle 10 by utilizing the global positioning system. The present position of the vehicle 10 is indicated, for example, by the latitude and the longitude. The fuel meter 107 measures the remaining amount of the fuel of the vehicle 10. If the vehicle 10 is a gasoline-powered vehicle, the fuel meter 107 measures the remaining amount of gasoline. If the vehicle 10 is a diesel car, the fuel meter 107 measures the remaining amount of gas oil (light oil). Further, if the vehicle 10 is an electric vehicle, the fuel meter 107 may measure the remaining amount of a rechargeable battery provided for the vehicle 10.

The guide server 200 is provided with CPU 201, a main storage unit 202, an auxiliary storage unit 203, a communication unit 204, and an input/output unit 205. CPU 201, the main storage unit 202, the auxiliary storage unit 203, the communication unit 204, and the input/output unit 205 are connected to one another by means of a connecting bus B2. CPU 201, the main storage unit 202, the auxiliary storage unit 203, the communication unit 204, and the input/output unit 205 are the same as or equivalent to CPU 101, the main storage unit 102, the auxiliary storage unit 103, the communication unit 104, and the input/output unit 105 of the vehicle onboard apparatus 100 respectively, any explanation of which will be omitted.

The signage 300 is provided with CPU 301, a main storage unit 302, an auxiliary storage unit 303, a communication unit 304, and a display unit 305. CPU 301, the main storage unit 302, the auxiliary storage unit 303, and the communication unit 304 are connected to one another by means of a connecting bus B3. CPU 301, the main storage unit 302, the auxiliary storage unit 303, and the communication unit 304 are the same as or equivalent to CPU 101, the main storage unit 102, the auxiliary storage unit 103, and the communication unit 104 of the vehicle onboard apparatus 100 respectively, any explanation of which will be omitted. The display unit 305 is, for example, a CRT display, LCD, PDP, an EL panel, an organic EL panel, or a speaker.

Figure 3:
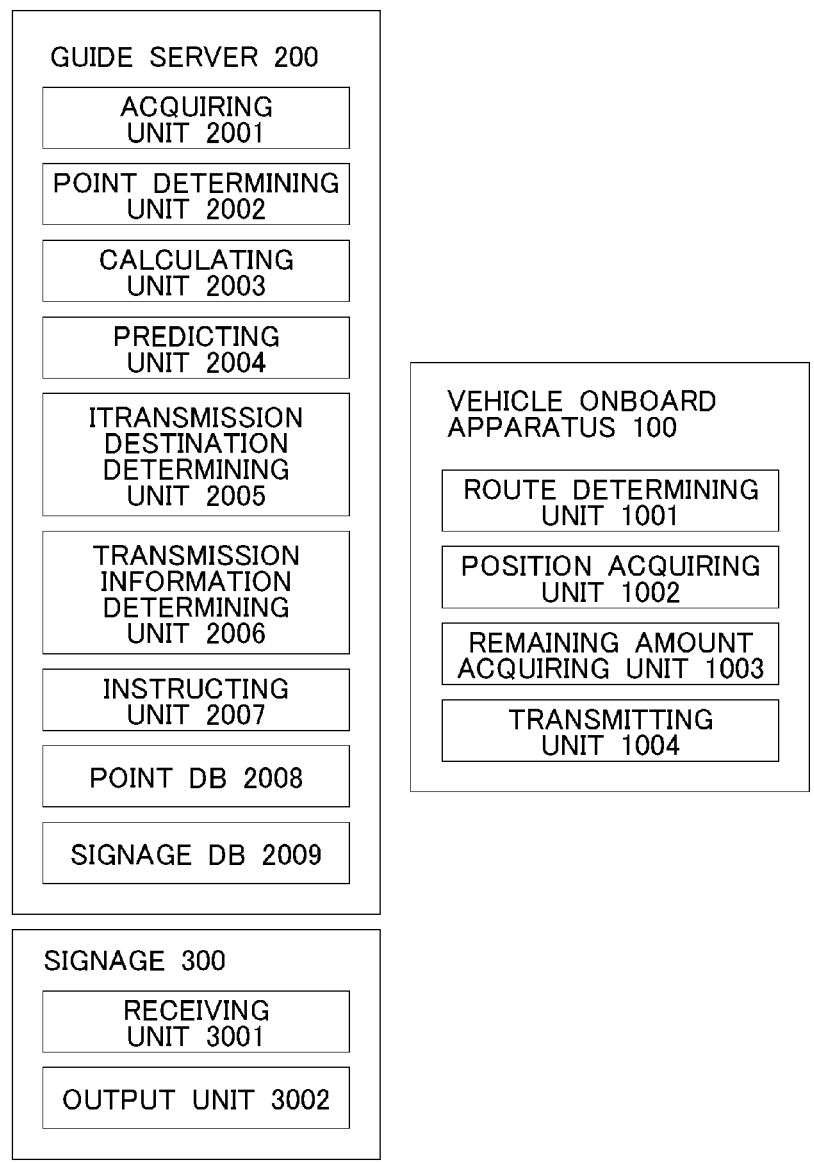
FIG. 3 shows exemplary logical configuration of the guide system according to the embodiment.

FIG. 3 shows exemplary logical configuration of the guide system. The logical configuration of the guide system 1 will be explained below with reference to FIG. 3.

<Vehicle Onboard Apparatus>

As for the vehicle onboard apparatus 100, CPU 101 reads and executes the program stored in the auxiliary storage unit 103 on the main storage unit 102, and thus a route determining unit 1001, a position acquiring unit 1002, a remaining amount acquiring unit 1003, and a transmitting unit 1004 are realized.

The route determining unit 1001 determines the traveling route from the present position of the vehicle 10 acquired by the position acquiring unit 1002 to the destination designated by the user by the aid of the input/output unit 105. The algorithm for determining the traveling route is not limited. The position acquiring unit 1002 acquires the present position of the vehicle 10 from the GPS device 106. The position acquiring unit 1002 acquires the present position of the vehicle 10 every predetermined periods. The remaining amount acquiring unit 1003 acquires the remaining amount of the fuel measured by the fuel meter 107. The transmitting unit 1004 transmits the traveling route determined by the route determining unit 1001, the present position of the vehicle 10 acquired by the position acquiring unit 1002, and the remaining amount of the fuel acquired by the remaining amount acquiring unit 1003 to the guide server 200.

<Guide Server>

As for the guide server 200, CPU 201 reads and executes the program stored in the auxiliary storage unit 203 on the main storage unit 202, and thus an acquiring unit 2001, a point determining unit 2002, a calculating unit 2003, a predicting unit 2004, a transmission destination determining unit 2005, a transmission information determining unit 2006, an instructing unit 2007, a point database (referred to as "DB" in the drawing) 2008, and a signage database 2009 are realized.

For example, information relevant to services provided at respective points in Japan or all over the world are stored in the point database 2008 while being correlated with each of the points. The information relevant to the services provided at the respective points can be exemplified, for example, by information of restaurants at the points, sightseeing information at the points, information of refueling at the points, and information of lodging facilities at the points.

FIG. 4 shows an exemplary point information table stored in the point database. The point information table 20081, which is stored in the point database 2008, includes respective items of "point", "classification", "information 1", "information 2", and "information 3". Information, which indicates positions of the respective points, is stored in the item of "point". The information, which indicates the position, is, for example, the latitude and the longitude. Information, which indicates the classification of the service provided at the point, is stored in the item of "classification". In the example shown in FIG. 4, five types are exemplified, i.e., "restaurant", "sightseeing", "refueling", "lodging", and "rest". However, the classification is not limited to the five types. The information, which correlates with the classification "refueling" in the point information table 20081, is an example of the "information relevant to a supply facility for supplying motive energy of a moving body used by the user to travel".

In FIG. 4, three types of "information 1", "information 2", and "information 3" are exemplified as the item for storing the information of the point. The degree of details of the stored information differs among the three types of items. That is, information, which indicates an outline of the point, is stored in the item of "information 1". Detailed information of the point is stored in the item of "information 3". Information, which has a degree of details that is approximately the middle between "information 1" and "information 3", is stored in the item of "information 2". For example, a shop name such as " Restaurant" may be stored in "information 1". Further, for example, the shop name and an outline of handled merchandise such as " Restaurant: Italian food" may be stored in "information 2". Further, for example, the shop name and detailed information of merchandise such as "** Restaurant: Italian food: Margherita 500 yen, Carbonara 1000 yen, Pescatore 1500 yen" may be stored in "information 3". The information, which is stored in "information 1", "information 2", and "information 3", is an example of the "plurality of levels of information ranging from information which indicates details of the facility to information which indicates an outline". Further, the information, which is stored in "information 1", "information 2", and "information 3", is an example of the fact that "the information relevant to the facility includes a plurality of levels of information having different amounts of information". The information, which is stored in each of the items of "information 1", "information 2", and "information 3", can be expressed in various forms including, for example, text data, image data, and moving image data. In this specification, the information, which is stored in each of the items of "information 1", "information 2", and "information 3", is hereinafter generally referred to as "advertisement information" as well.

FIG. 5 shows an exemplary classification management table stored in the point database. The classification management table 20082, which is stored in the point database 2008, includes respective items of "classification" and "time zone". The item of "classification" is the same as or equivalent to that of the point information table 20081 shown in FIG. 4. Information, which indicates the main time zone of the utilization of the service classified into the classification, is stored in the item of "time zone". A plurality of time zones may be stored in the item of "time zone". For example, in the case of the restaurant, a plurality of time zones, which include, for example, a time zone of breakfast, a time zone of lunch, and a time zone of dinner, may be stored. Further, for example, in the case of the lodging, a time zone, which ranges from the evening to the dawn, may be stored. Further, in the case of the sightseeing, a time zone, in which people can enter the facility as the sightseeing target, may be stored.

For example, a correlation between the information for distinguishing the signage 300 and the position of the signage 300 is stored in the signage database 2009. FIG. 6 shows an exemplary signage management table of the signage database. The signage management table 20091 includes respective items of "ID" and "position". ID information for distinguishing the signage 300 respectively is stored in the item of "ID". If the guide server 200 and the signage 300 make communication in accordance with TCP/IP, an IP address of the signage 300 may be stored as ID. When the configuration is adopted as described above, the guide server 200 can thereby communicate with the signage 300 by designating ID. Information, which indicates the position of arrangement of the signage 300 respectively, is stored in the item of "position".

With reference to FIG. 3 again, the acquiring unit 2001 acquires the traveling route transmitted from the vehicle onboard apparatus 100 and the present position of the vehicle 10. The acquiring unit 2001 stores the acquired traveling route in the auxiliary storage unit 203. The advertisement information about the point for which the information is stored in the point information table 20081, of the points existing on the traveling route acquired by the acquiring unit 2001 is designated by the point determining unit 2002 as the candidate for the advertisement information to be delivered.

The calculating unit 2003 calculates the traveling period of time until arrival of the vehicle 10 at each of the points determined by the point determining unit 2002. The calculating unit 2003 further calculates the time of arrival at which the vehicle 10 arrives at each of the points determined by the point determining unit 2002, on the basis of the calculated traveling period of time and the time at which the vehicle 10 started the travel. For example, the point at which the traveling period of time of the vehicle 10 between the points is a predetermined period of time (for example, 1 hour), of the candidates for the point for delivering the advertisement information is determined by the point determining unit 2002 as the point at which the advertisement information in relation to the point is to be delivered.

The predicting unit 2004 predicts the service of which classification the user of the vehicle 10 utilizes at each of the points determined by the point determining unit 2002, on the basis of the time of arrival and the traveling period of time calculated by the calculating unit 2003. That is, it is possible to affirm that the predicting unit 2004 judges which classification the service belongs to, the service being suitable for the user of the vehicle 10. The predicting unit 2004 specifies the classification corresponding to the time zone to which the time of arrival belongs, in relation to each of the points, for example, by making reference to the classification management table 20082.

The transmission destination determining unit 2005 determines the signage 300 which is to be designated as the transmission destination of the advertisement information. The signage 300, which is to be designated as the transmission destination, is, for example, the signage 300 which is arranged near to the present position of the vehicle 10 (within a range of a predetermined distance). Further, for example, the signage 300 to be designated as the transmission destination is the signage 300 which is arranged in the traveling direction of the vehicle 10 in the vicinity of the present position of the vehicle 10. One signage 300 or a plurality of signages 300 may be available as the signage 300 or signages 300 to be designated as the transmission destination or the transmission destinations. The transmission destination determining unit 2005 determines the signage 300 to be designated as the transmission destination by making reference to the signage management table 20091 on the basis of the present position of the vehicle 10 acquired by the acquiring unit 2001.

The transmission information determining unit 2006 determines the advertisement information to be transmitted to the signage 300. The advertisement information, which is relevant to the point at which the vehicle 10 arrives next time, for example, of the points determined by the point determining unit 2002, is determined by the transmission information determining unit 2006 as the advertisement information to be transmitted. The point, at which the vehicle 10 arrives next time, may be determined, for example, on the basis of the present position of the vehicle 10 and the traveling route. Further, the transmission information determining unit 2006 determines the classification of the advertisement information to be transmitted. The classification may be determined, for example, by making reference to the classification management table 20082 on the basis of the time zone in which the vehicle 10 arrives at the next point. Further, as for the classification, if the remaining amount of the fuel of the vehicle 10 is not more than a predetermined amount, "refueling" may be determined as the classification of the advertisement information.

The shorter the distance between the vehicle 10 and the point at which the vehicle 10 arrives next time is, the more detailed the advertisement information delivered by the transmission information determining unit 2006 is. For example, when the first distance is longer than the second distance, if the distance between the vehicle 10 and the point at which the vehicle 10 arrives next time is not less than the first distance, then the transmission information determining unit 2006 determines the information stored in "information 1" of the point database 2008 as the advertisement information to be transmitted. Further, for example, if the distance between the vehicle 10 and the point at which the vehicle 10 arrives next time is not less than the second distance and less than the first distance, the transmission information determining unit 2006 determines the information stored in "information 2" of the point database 2008 as the advertisement information to be transmitted. Further, for example, if the distance between the vehicle 10 and the point at which the vehicle 10 arrives next time is less than the second distance, the transmission information determining unit 2006 determines the information stored in "information 3" of the point database 2008 as the advertisement information to be transmitted. That is, the transmission information determining unit 2006 determines, as the advertisement information to be transmitted, the advertisement information about the point at which the vehicle 10 arrives next time. Further, the transmission information determining unit 2006 specializes the advertisement information to be transmitted, on the basis of the classification and the degree of details of the information.

The instructing unit 2007 transmits the advertisement information specialized by the transmission information determining unit 2006 to the signage 300 determined by the transmission destination determining unit 2005 so that the instructing unit 2007 instructs the signage 300 to output the advertisement information. Further, if it is judged that the vehicle 10 has passed through the signage 300 instructed to output the advertisement information, on the basis of the present position of the vehicle 10, the instructing unit 2007 instructs the signage 300 to stop the output of the advertisement information.

<Signage>

As for the signage 300, CPU 301 reads and executes the program stored in the auxiliary storage unit 303 on the main storage unit 302, and thus a receiving unit 3001 and an output unit 3002 are realized. The receiving unit 3001 receives the advertisement information from the guide server 200 by the aid of the communication unit 304. The output unit 3002 allows the display unit 305 to display the advertisement information received by the receiving unit 3001.

<Exemplary Processing>

Figure 7:
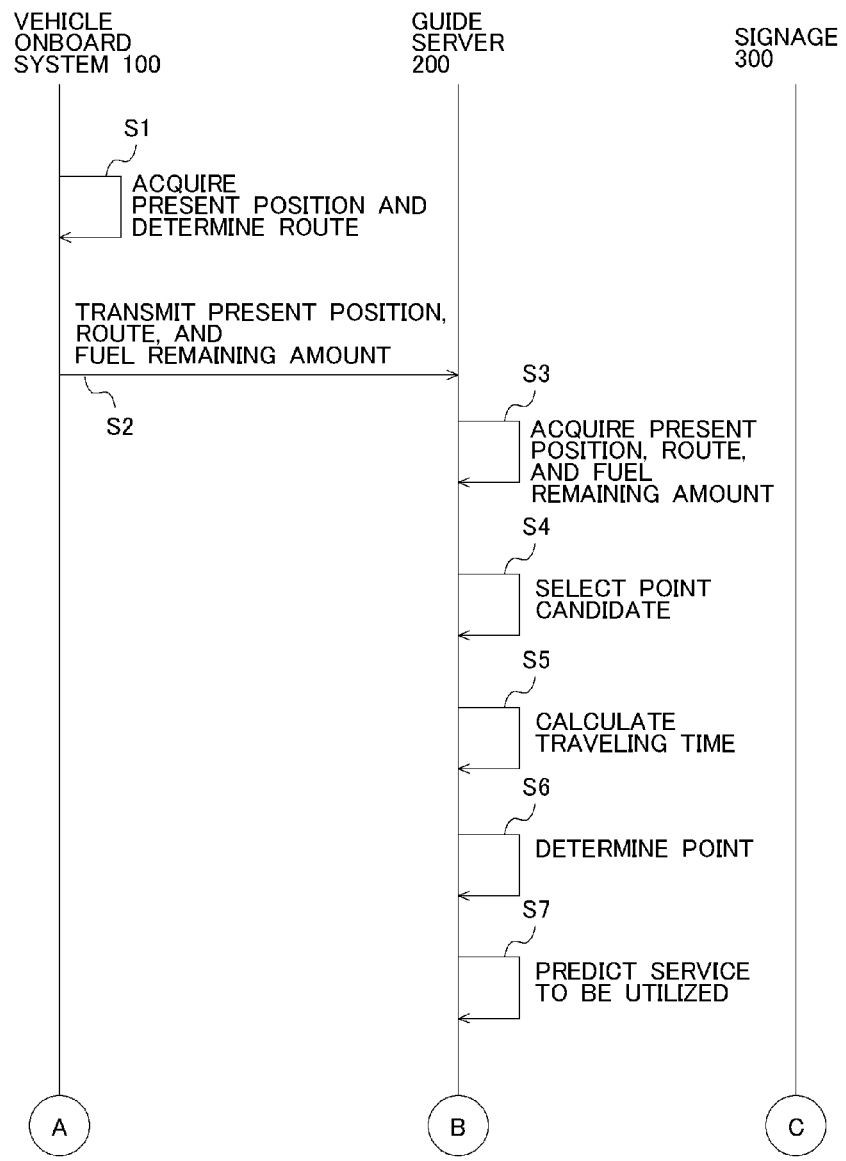
FIG. 7 shows a first drawing illustrating an exemplary processing sequence of the guide system according to the embodiment.
Figure 8:
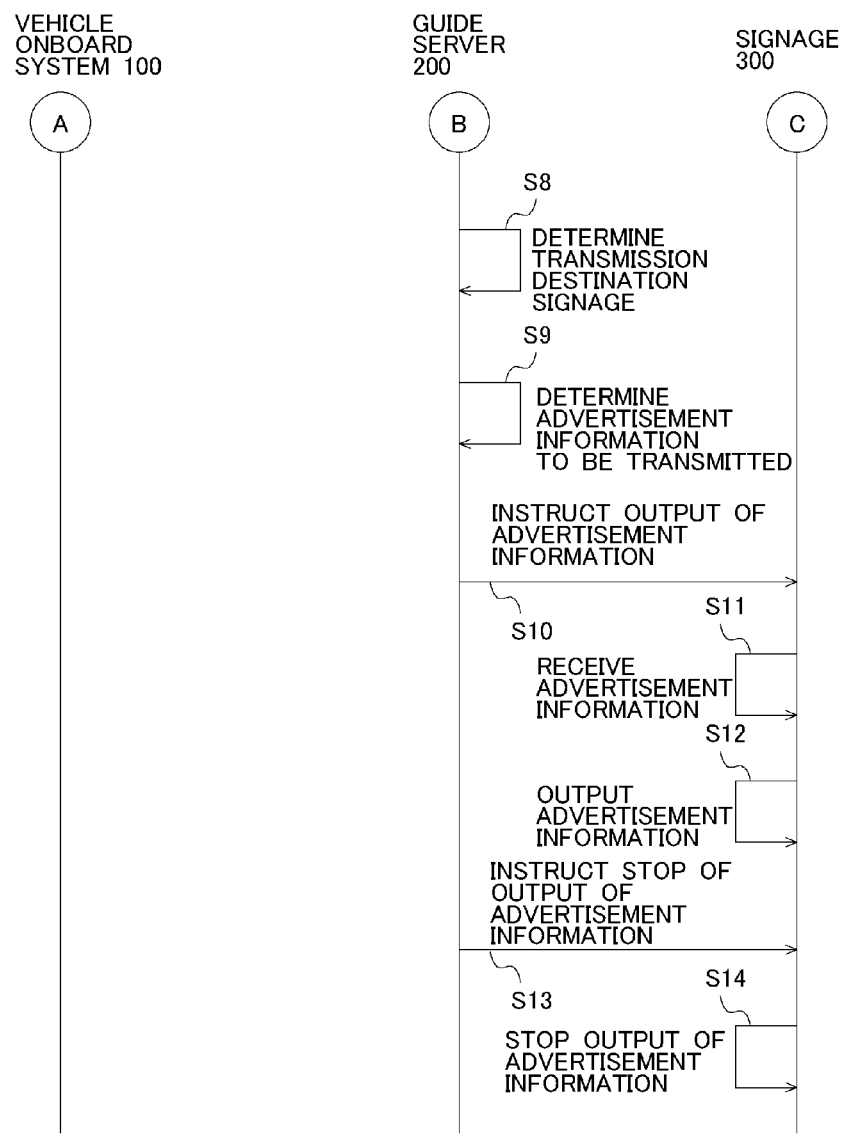
FIG. 8 shows a second drawing illustrating the exemplary processing sequence of the guide system according to the embodiment.

FIGS. 7 and 8 show an exemplary processing sequence of the guide system according to the embodiment. "A", "B", and "C" shown in FIG. 7 are continued to "A", "B", and "C" shown in FIG. 8 respectively. An explanation will be made below with reference to FIGS. 7 and 8 about the exemplary processing sequence of the guide system according to the embodiment.

In S1, the vehicle onboard apparatus 100 determines the traveling route of the vehicle 10. The position acquiring unit 1002 of the vehicle onboard apparatus 100 acquires the present position of the vehicle 10 from the GPS device 106. The route determining unit 1001 determines the traveling route of the vehicle 10 on the basis of the present position of the vehicle 10 acquired by the position acquiring unit 1002 and the destination designated by the user. Further, the remaining amount acquiring unit 1003 acquires the remaining amount of the fuel of the vehicle 10. In S2, the transmitting unit 1004 of the vehicle onboard apparatus 100 transmits the present position of the vehicle 10, the traveling route, and the remaining amount of the fuel of the vehicle 10 to the guide server 200. Note that the position acquiring unit 1002 acquires the present position of the vehicle 10 at predetermined intervals, the remaining amount acquiring unit 1003 acquires the remaining amount of the fuel of the vehicle 10 at predetermined intervals, and the transmitting unit 1004 transmits the present position of the vehicle 10 and the remaining amount of the fuel of the vehicle 10 to the guide server 200 at predetermined intervals.

In S3, the acquiring unit 2001 of the guide server 200 acquires the present position of the vehicle 10, the traveling route, and the remaining amount of the fuel transmitted from the vehicle onboard apparatus 100, and the present position of the vehicle 10, the traveling route, and the remaining amount of the fuel are stored in the auxiliary storage unit 203. The process of S3 is an example of "acquisition or estimation of a traveling route of a user" and "acquisition of a remaining amount of the motive energy of the moving body".

In S4, the point determining unit 2002 determines the point which is the candidate for the advertisement information to be delivered, from the traveling route of the vehicle 10 and the point information table 20081 of the point database 2008. In S5, the calculating unit 2003 calculates the traveling periods of time of the vehicle 10 to arrive at the respective points determined by the point determining unit 2002. The calculating unit 2003 further calculates the time of arrival at which the vehicle 10 arrives, on the basis of the calculated traveling period of time and the time at which the vehicle 10 started the travel. The process from S4 to S5 is an example of "calculation of temporal information including at least one of a passage time at which the user passes through a point on the traveling route and a traveling period of time which is required until arrival at the point after starting a travel".

In S6, the point determining unit 2002 determines, as the point to which the advertisement information is to be delivered, the point at which the traveling period of time of the vehicle 10 between the points is a predetermined period of time (for example, 1 hour), of the candidates for the point to which the advertisement information is to be delivered.

In S7, the predicting unit 2004 predicts the classification of the service to be utilized by the user at each of the points determined by the point determining unit 2002, on the basis of the time of arrival and the traveling period of time calculated by the calculating unit 2003. That is, the predicting unit 2004 determines the classification of the service suitable for the user who passes through each of the points, on the basis of the time of arrival and the traveling period of time calculated by the calculating unit 2003.

In S8, the transmission destination determining unit 2005 determines the signage 300 which is designated as the transmission destination of the advertisement information, on the basis of the present position of the vehicle 10. In S9, the transmission information determining unit 2006 determines the advertisement information to be transmitted to the signage 300. The transmission information determining unit 2006 determines the advertisement information of which classification is to be transmitted to what extent of the degree of details, of the advertisement information in relation to the next point, on the basis of the time zone in which the vehicle 10 arrives at the next point and the distance between the vehicle 10 and the point at which the vehicle 10 arrives next time. Further, the transmission information determining unit 2006 may transmit the advertisement information of the classification "fuel", if the remaining amount of the fuel of the vehicle 10 is not more than a predetermined amount. The transmission information determining unit 2006 acquires the determined advertisement information from the point information table 20081. The process from S7 to S9 is an example of "acquisition of information relevant to a facility suitable for the user who passes through the point, of a plurality of facilities existing around the point on the basis of the temporal information".

In S10, the instructing unit 2007 transmits the advertisement information acquired in S9 to the signage 300 determined in S8, and thus the instructing unit 2007 instructs the signage 300 to output the advertisement information. The process of S10 is an example of "output of the information relevant to the facility by means of an output unit".

In S11, the receiving unit 3001 of the signage 300 receives the advertisement information transmitted from the guide server 200. In S12, the output unit 3002 allows the display unit 305 to display the advertisement information received in S11.

In S13, if it is judged that the vehicle 10 passes through the signage 300 to which the advertisement information is instructed to be outputted, the instructing unit 2007 of the guide server 200 instructs the signage 300 to stop the output of the advertisement information.

In S14, the output unit 3002 of the signage 300 stops the output of the advertisement information in accordance with the instruction transmitted in S13.

(Example of Application)

Figure 9:
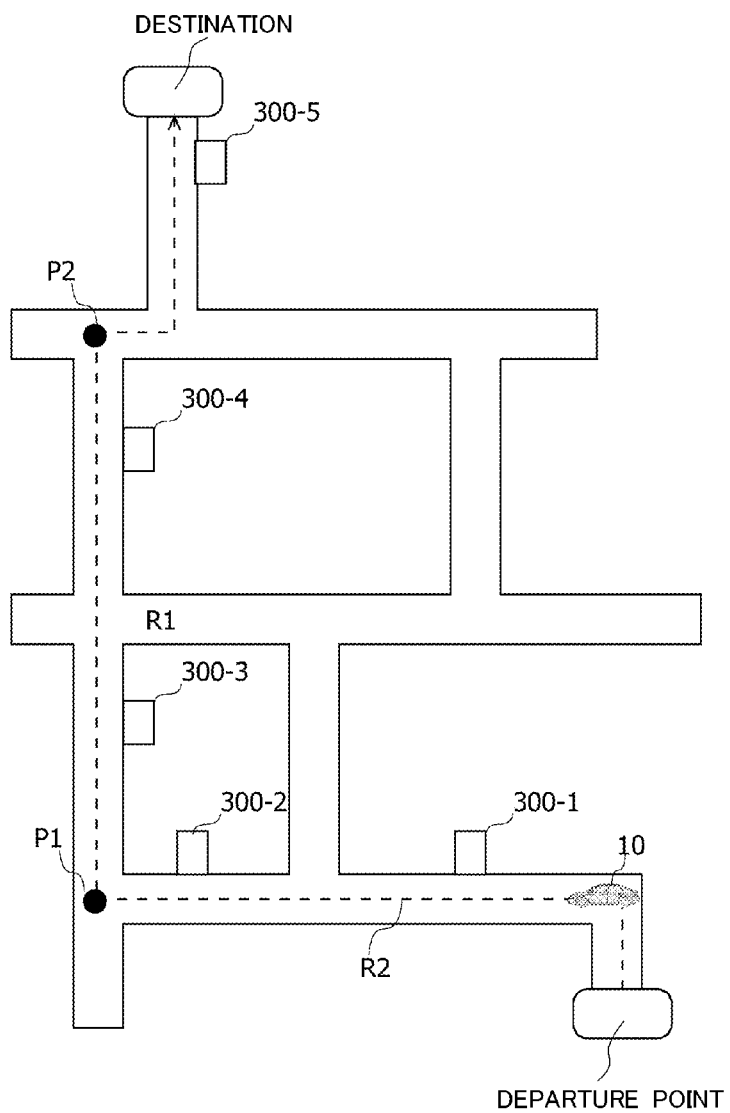
FIG. 9 shows an example of application of the guide system according to the embodiment.

FIG. 9 shows an example of application of the guide system according to the embodiment. FIG. 9 exemplifies the road R1 including the route ranging from the departure point to the destination. Those shown by black circles in FIG. 9 are Points P1, P2 determined by the point determining unit of the guide server 200. In FIG. 9, one indicated by a dotted line shows the traveling route R2 from the departure point to the destination as determined by the route determining unit 1001 of the vehicle onboard apparatus 100. A plurality of signages 300 (300-1, 300-2, 300-3, 300-4, 300-5) are arranged so that they face the road R1. An example of application of the guide system 1 will be explained with reference to FIG. 9.

The vehicle 10 travels in accordance with the traveling route R2 after the departure from the departure point, and the point, at which the vehicle 10 arrives next time, is Point P1. Further, the signages 300-1, 300-2 are arranged between the departure point and Point P1. The signage 300-2 is arranged at the position near to Point P1 as compared with the signage 300-1. In this case, it is assumed that the distance between the signage 300-2 and Point P1 is less than the second distance, and the distance between the signage 300-1 and Point P1 is not less than the first distance.

The guide server 200 determines that the advertisement information relevant to Point P1 is the advertisement information to be transmitted during the period in which the vehicle 10 travels toward Point P1. For example, if the time zone, in which the vehicle 10 arrives at Point P1, is a time zone in which people take lunch, the guide server 200 specializes the advertisement information to be transmitted into the advertisement information corresponding to the classification "restaurant", of the advertisement information relevant to Point P1. That is, the guide server 200 determines the advertisement information corresponding to the classification "restaurant" at Point P1 as the advertisement information to be transmitted. If the present position of the vehicle 10 approaches the signage 300-1, the guide server 200 designates the signage 300-1 as the transmission destination of the advertisement information. Further, the distance between Point P1 and the signage 300-1 is not less than the first distance, and hence the guide server 200 determines, as the advertisement information to be transmitted, the information stored in "information 1" of the point database 2008. If the vehicle 10 approaches the signage 300-1, the guide server 200 allows the signage 300-1 to output the advertisement information stored in "information 1" of the point database 2008. Subsequently, if the vehicle 10 passes through the signage 300-1, the guide server 200 allows the signage 300-1 to stop the output of the advertisement information.

If the present position of the vehicle 10 approaches the signage 300-2, the guide server 200 designates the signage 300-2 as the transmission destination of the advertisement information. Further, the distance between Point P1 and the signage 300-2 is less than the second distance, and hence the guide server 200 determines, as the advertisement information to be transmitted, the information stored in "information 3" of the point database 2008. If the vehicle 10 approaches the signage 300-2, the guide server 200 allows the signage 300-2 to output the advertisement information stored in "information 3" of the point database 2008. That is, the advertisement information, which is more detailed than the advertisement information having been displayed on the signage 300-1, is displayed on the signage 300-2. The process, in which the more detailed advertisement information as compared with the advertisement information having been displayed on the signage 300-1 is displayed on the signage 300-2, is an example of "to output more detailed information relevant to the facility as the user more approaches the point". Further, the process, in which the more detailed advertisement information as compared with the advertisement information having been displayed on the signage 300-1 is displayed on the signage 300-2, is an example of "to output information relevant to the facility while increasing the amount of information as the user more approaches the point". If the vehicle 10 passes through the signage 300-2, the guide server 200 allows the signage 300-2 to stop the output of the advertisement information.

The point, toward which the vehicle 10 having passed through Point P1 travels next time, is Point P2. The signages 300-3, 300-4 are arranged between Point P1 and Point P2. The signage 300-4 is arranged at the position near to Point P2 as compared with the signage 300-3. In this case, it is assumed that the distance between the signage 300-4 and Point P1 is not less than the second distance and less than first distance, and the distance between the signage 300-3 and Point P1 is not less than the first distance.

The guide server 200 determines the advertisement information about Point P2 as the advertisement information to be transmitted during the period in which the vehicle 10 travels toward Point P2. For example, if the time zone, in which the vehicle 10 arrives at Point P2, is the time zone of lunch, the guide server 200 specializes the advertisement information to be transmitted into the information corresponding to the classification "restaurant", of the advertisement information in relation to Point P2. That is, the guide server 200 determines the advertisement information corresponding to the classification "restaurant" of Point P2 as the advertisement information to be transmitted.

If the present position of the vehicle 10 approaches the signage 300-3, the guide server 200 designates the signage 300-3 as the transmission destination of the advertisement information. Further, the distance between Point P2 and the signage 300-3 is not less than the first distance, and hence the guide server 200 determines the information stored in "information 1" of the point database 2008 as the advertisement information to be transmitted. If the vehicle 10 approaches the signage 300-3, the guide server 200 allows the signage 300-3 to output the advertisement information stored in "information 1" of the point database 2008. Subsequently, if the vehicle 10 passes through the signage 300-3, the guide server 200 allows the signage 300-3 to stop the output of the advertisement information.

If the present position of the vehicle 10 approaches the signage 300-4, the guide server 200 designates the signage 300-4 as the transmission destination of the advertisement information. Further, the distance between Point P2 and the signage 300-4 is not less than the second distance and less than the first distance, and hence the guide server 200 determines the information stored in "information 2" of the point database 2008 as the advertisement information to be transmitted. If the vehicle 10 approaches the signage 300-4, the guide server 200 allows the signage 300-4 to output the advertisement information stored in "information 2" of the point database 2008. That is, the advertisement information, which is more detailed than the advertisement information having been displayed on the signage 300-3, is displayed on the signage 300-4. If the vehicle 10 passes through the signage 300-4, the guide server 200 allows the signage 300-4 to stop the output of the advertisement information.

The point, toward which the vehicle 10 having passed through Point P2 travels next time, is the destination. The signage 300-5 is arranged between Point P2 and the destination. In this case, it is assumed that the distance between the signage 300-5 and the destination is less than the second distance.

If the present position of the vehicle 10 approaches the signage 300-5, the guide server 200 designates the signage 300-5 as the transmission destination of the advertisement information. Further, the distance between the destination and the signage 300-5 is less than the second distance, and hence the guide server 200 determines the information stored in "information 3" of the point database 2008 as the advertisement information to be transmitted. If the vehicle 10 approaches the signage 300-5, the guide server 200 allows the signage 300-5 to output the advertisement information stored in "information 3" of the point database 2008. If the vehicle 10 passes through the signage 300-5, the guide server allows the signage 300-5 to stop the output of the advertisement information.

<Function and Effect of Embodiment>

According to the embodiment, the traveling route of the vehicle 10, the present position, and the remaining amount of the fuel are transmitted from the vehicle onboard apparatus 100 to the guide server 200. The guide server 200 determines the point on the traveling route on the basis of the information acquired from the vehicle onboard apparatus 100, and the guide server 200 calculates, for example, the time of arrival at which the vehicle 10 arrives at the determined point and the traveling period of time required until the vehicle 10 arrives at the determined point. The guide server 200 predicts the classification of the service to be utilized by the user by making reference to the classification management table 20082 on the basis of the traveling period of time and the time of arrival. The guide server 200 makes reference to the point information table 20081, and the guide server 200 allows the signage 300 to output the advertisement information which corresponds to the classification of the predicted service. Therefore, the guide server 200 according to the embodiment can output the advertisement information which conforms to the classification of the service predicted to be utilized by the user.

If the vehicle 10 passes through the signage 300, the guide server 200 allows the signage 300 to stop the output of the advertisement information. Therefore, the signage 300, which has stopped the output of the advertisement information, can output any information which is different from the advertisement information transmitted from the guide server 200. It is possible to effectively make the use of the signage 300.

Other Embodiments

The foregoing embodiment has been described by way of example in every sense. The present disclosure can be carried out while being appropriately changed within a range without deviating from the gist or essential characteristics thereof.

If a predetermined period of time, after which it is considered that the user desires a rest, elapses as the traveling period of time after the start of the travel, then the guide server 200 may acquire the information correlated with the classification "rest" from the point information table 20081, and the signage 300 may be allowed to output the information. The predetermined period of time, after which it is considered that the user desires a rest, may be previously stored in the auxiliary storage unit 203 of the guide server 200.

A plurality of signages 300 may be arranged in an area which can be visually recognized by the user at once. In such a situation, the guide server 200 may allow the plurality of signages 300 to output identical advertisement information respectively. Further, if a plurality of pieces of advertisement information, which correspond to the predicated activity of the user, are present in the point information table 20081 and the classification management table 20082, the guide server 200 may allow the plurality of signages 300 to output different pieces of advertisement information respectively.

Further, if a plurality of signages 300 are arranged in an area which can be visually recognized by the user at once, the frequency to output the advertisement information may be raised such that the guide server 200 increases the number of signages 300 for outputting the advertisement information relevant to the point, as the vehicle 10 more approaches the point determined by the point determining unit 2002. For example, if a plurality of signages 300 are arranged while being aligned along the traveling route, the guide server 200 may raise the frequency to output the advertisement information as follows. That is, if the vehicle 10 is separated from the point determined by the point determining unit 2002 by not less than a predetermined distance, the signages 300, which are arranged every first predetermined numbers of signages, are determined as output destinations. If the vehicle 10 approaches the point determined by the point determining unit 2002 so that the distance therebetween is shorter than the predetermined distance, the signages 300, which are arranged every second predetermined numbers of signages smaller than the first predetermined numbers of signages, are determined as output destinations.

The vehicle onboard apparatus 100 may acquire the position information of the place through which the vehicle 10 has passed, by utilizing the GPS device 106. The vehicle onboard apparatus 100 may transmit the acquired position information as the action history utilized by the user to the guide server 200. The guide server 200 extracts the facility which conforms to the position information included in the received action history, from the point information table 20081. The extracted facility is stored as the information of the facility utilized by the user, in the auxiliary storage unit 203. The information of the facility utilized by the user stored in the auxiliary storage unit 203 is an example of the "action history including a list of facilities having been utilized by the user".

If a plurality of pieces of advertisement information corresponding to the predicted activity of the user are present, then the guide server 200 may acquire the advertisement information relevant to the facility utilized by the user from the point information table 20081, and the guide server 200 may allow the signage 300 to preferentially output the acquired information. The phrase "allow the signage 300 to preferentially output" is as follows. That is, for example, if one signage 300 is provided to output the advertisement information, the advertisement information relevant to the facility utilized by the user may be outputted without outputting any information of any other facility. Further, if a plurality of signages 300 are present to output the advertisement information, a larger number of signages 300 are allowed to output the advertisement information relevant to the facility utilized by the user, as compared with any other information. When the configuration is adopted as described above, then the guide server 200 can remind the user of the facility utilized in the past, and it is possible to prompt the utilization of the facility. The acquisition of the advertisement information relevant to the facility utilized by the user from the point information table 20081 is an example of "acquisition of information relevant to the facility included in the action history, of the facilities suitable for the predicted action".

On the other hand, the signage 300 may be allowed to preferentially output any information relevant to any facility having been not utilized by the user. When the guide server 200 adopts the configuration as described above, it is thereby possible to propose, to the user, a new facility having been not utilized by the user.

The vehicle onboard apparatus 100 may be provided with a function for the user to make communication with any other person such as friends, members of a family and the like. If the vehicle onboard apparatus 100 detects exchange (giving and receiving) of information including a place and date information or time information in the communication of the user with any other person, the vehicle onboard apparatus 100 may extract the information as an action schedule of the user. The extraction of the information as the action schedule of the user is an example of "acquisition of an action schedule of the user from communication data of communication having been made between the user and another person". The information including the date information or the time information is, for example, "meal at ** restaurant at 18:30". The vehicle onboard apparatus 100 transmits the extracted action schedule to the guide server 200.

The guide server 200 extracts the information which indicates the time and the place from the action schedule received from the vehicle onboard apparatus 100. The information relevant to the facility which conforms to the extracted information is acquired from the point information table 20081. The guide server 200 may allow the signage 300 to output the information acquired from the point information table 20081. When the configuration is adopted as described above, the guide server 200 can thereby allow the signage 300 to output the information which more conforms to the purpose of the user. Note that the user may input the purpose of the user into the vehicle onboard apparatus 100, for example, when the traveling route is determined, and the vehicle onboard apparatus 100 may transmit the inputted purpose to the guide server 200. The procedure, in which the information to indicate the time and the place is extracted from the action schedule received from the vehicle onboard apparatus 100 and the information relevant to the facility which conforms to the extracted information is acquired from the point information table 20081, is an example of "prediction of the action of the user at the point on the basis of the action schedule and the temporal information".

In the embodiment, it is assumed that the user travels while getting on the vehicle 10, and the vehicle onboard apparatus 100 transmits various pieces of information relevant to the user with respect to the guide server 200. However, the apparatus or device, which transmits the information to the guide server 200, is not limited to the vehicle onboard apparatus 100. For example, a transportable information processing apparatus or device such as a smartphone or the like may be adopted in place of the vehicle onboard apparatus 100. When the transportable information processing apparatus or device is adopted, it is thereby possible to provide the output of the information relevant to the facility by the guide server 200, for example, for the user who travels on foot or by bicycle.

In the embodiment, the advertisement information is stored in the point database 2008 of the guide server 200. However, the advertisement information may be stored in any other apparatus or device. For example, the information, which indicates the apparatus or device managed by each of the facilities, the apparatus or device storing the information of each of the facilities, may be stored in the point database 2008. In such a case, the guide server 200 may acquire the information by making the access to the apparatus or device which stores the information of the facility in accordance with the information stored in the point database 2008. When the configuration is adopted as described above, then the guide server 200 can acquire the latest information in relation to each of the facilities, and the acquired latest information can be outputted to the signage 300.

The processes and the means explained in this disclosure can be carried out while freely combining them unless any technical contradiction or inconsistency arises.

Further, the process, which has been explained as being performed by one apparatus or device, may be executed by a plurality of apparatuses or devices in a shared manner. Alternatively, the process, which has been explained as being performed by the different apparatuses or devices, may be executed by one apparatus or device without causing any problem. In the computer system, it is possible to flexibly change the way of realization of the respective functions by means of any hardware configuration (server configuration).

The present disclosure can be also realized such that a computer program, in which the functions explained in the foregoing embodiments are packaged, is supplied to a computer, and the program is read and executed by one or more processors possessed by the computer. The computer program as described above may be provided for the computer by means of any non-transitory computer-readable storage medium capable of being connected to a system bus of the computer, or the computer program may be provided for the computer by the aid of a network. The non-transitory computer-readable storage medium includes, for example, disks of arbitrary types such as magnetic disk (floppy (registered trademark) disk, hard disk drive (HDD) and the like), optical disk (CD-ROM, DVD disk, Blu-ray Disc and the like) and the like, read only memory (ROM), random access memory (RAM), EPROM, EEPROM, magnetic card, flash memory, optical card, and media of arbitrary types suitable for storing electronic commands.

What is claimed is:

1. An information processing apparatus comprising a controller which executes:
   acquisition or estimation of a traveling route of a user;
   calculation of temporal information including at least one of a passage time at which the user passes through a point on the traveling route and a traveling period of time which is required until arrival at the point after starting a travel;
   acquisition of information relevant to a facility, which is suitable for the user who passes through the point, of a plurality of facilities existing around the point on the basis of the temporal information; and
   output of the information relevant to the facility by a display, wherein, after the information is initially outputted, the controller increases an amount of the information as the user approaches the point.

2. The information processing apparatus according to claim 1, wherein the controller raises a frequency of output of the information relevant to the facility as the user approaches the point.

3. The information processing apparatus according to claim 1, wherein:
   the information relevant to the facility includes a plurality of levels of information ranging from information which indicates details of the facility to information which indicates an outline; and
   the controller allows the display to output more detailed information relevant to the facility as the user approaches the point.

4. The information processing apparatus according to claim 1, wherein
   the information relevant to the facility includes a plurality of levels of information having different amounts of information.

5. The information processing apparatus according to claim 1, wherein:
   the information relevant to the facility includes information relevant to a supply facility for supplying motive energy of a moving body used by the user to travel; and
   the controller executes:
      acquisition of a remaining amount of the motive energy of the moving body;
      prediction of a supply area for supplying the motive energy of the moving body on the basis of the acquired remaining amount;
      acquisition of the information relevant to the supply facility existing around the supply area; and
      output of the extracted information relevant to the supply facility by the display.

6. The information processing apparatus according to claim 1, wherein the controller executes:
   acquisition of an action history including a list of facilities having been utilized by the user; and
   acquisition of information relevant to the facility, which is included in the action history, of the facilities suitable for the user who passes through the point.

7. The information processing apparatus according to claim 1, wherein the controller executes:
   acquisition of an action schedule of the user from communication data of communication having been made between the user and another person; and
   acquisition of information relevant to the facility suitable for the user who passes through the point, on the basis of the action schedule and the temporal information.

8. The information processing apparatus according to claim 1, wherein the display is a digital signage arranged on the traveling route.

9. An information processing method comprising:
   acquiring or estimating a traveling route of a user;
   calculating temporal information including at least one of a passage time at which the user passes through a point on the traveling route and a traveling period of time which is required until arrival at the point after starting a travel;
   acquiring information relevant to a facility, which is suitable for the user who passes through the point, of a plurality of facilities existing around the point on the basis of the temporal information; and
   outputting the information relevant to the facility by a display, wherein, after the information is initially outputted, an amount of the information is increased as the user approaches the point.

10. A non-transitory storage medium comprising an information processing program, the information processing program configured to cause a computer to execute:
    acquisition or estimation of a traveling route of a user;
    calculation of temporal information including at least one of a passage time at which the user passes through a point on the traveling route and a traveling period of time which is required until arrival at the point after starting a travel;
    acquisition of information relevant to a facility, which is suitable for the user who passes through the point, of a plurality of facilities existing around the point on the basis of the temporal information; and
    output of the information relevant to the facility by a display, wherein, after the information is initially outputted, the computer increases an amount of the information as the user approaches the point.

* * * * *